US009984675B2

(12) United States Patent
Schuster et al.

(10) Patent No.: US 9,984,675 B2
(45) Date of Patent: May 29, 2018

(54) VOICE CONTROLLED AUDIO RECORDING SYSTEM WITH ADJUSTABLE BEAMFORMING

(71) Applicant: Google Technology Holdings LLC, Mountain View, CA (US)

(72) Inventors: Adrian M Schuster, West Olive, MI (US); Plamen A Ivanov, Schaumburg, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 408 days.

(21) Appl. No.: 13/956,335

(22) Filed: Jul. 31, 2013

(65) Prior Publication Data

US 2014/0350926 A1 Nov. 27, 2014

Related U.S. Application Data

(60) Provisional application No. 61/827,052, filed on May 24, 2013.

(51) Int. Cl.
*G10L 15/00* (2013.01)
*G10L 15/26* (2006.01)
(Continued)

(52) U.S. Cl.
CPC .............. *G10L 15/00* (2013.01); *G10L 15/26* (2013.01); *G10L 21/0208* (2013.01);
(Continued)

(58) Field of Classification Search
CPC .......... G10L 2021/02166; G10L 15/00; H04R 2410/01; H04R 3/005
(Continued)

(56) References Cited

U.S. PATENT DOCUMENTS 4,535,445 A * 8/1985 Lane ..................... H04Q 11/04
370/268
5,521,635 A 5/1996 Mitsuhashi et al.
(Continued)

FOREIGN PATENT DOCUMENTS

JP 2001-203974 7/2001

OTHER PUBLICATIONS

Anusuya, M.A. et al., "Speech Recognition by Machine: A Reivew," (IJCSIS) International Journal of Computer Science and Information Security, vol. 6., No. 3, 2009, 25 pages.
(Continued)

*Primary Examiner* — Paras D Shah
*Assistant Examiner* — Oluwadamilola M Ogunbiyi
(74) *Attorney, Agent, or Firm* — Shumaker & Sieffert, P.A.

(57) ABSTRACT

A method of operation beamforms a plurality of microphone outputs to obtain a plurality of virtual microphone audio channels with at least one audio output channel and at least one audio control channel. The method performs voice recognition on the audio control channel to detect voice commands for controlling audio output channel attributes, and adjusts an audio channel attribute in response to detecting a voice command. Adjusting an attribute of the audio channel may be accomplished by, for example, controlling one or more parameters of an adjustable beamformer. The detected voice commands for controlling audio channel attributes may include voice commands for controlling audio sensitivity zooming, panning in a specified direction, focusing on a specified direction, blocking a specified direction, mixing a narrator's voice, blocking a narrator's voice, or reducing background noise. An apparatus that performs the method of operation is also disclosed.

12 Claims, 10 Drawing Sheets

(51) Int. Cl.
*H04R 3/00* (2006.01)
*G10L 21/0208* (2013.01)
*H04R 1/40* (2006.01)
*G10L 21/0216* (2013.01)

(52) U.S. Cl.
CPC ............ *H04R 1/406* (2013.01); *H04R 3/005* (2013.01); *G10L 2021/02166* (2013.01); *H04R 2410/01* (2013.01)

(58) Field of Classification Search
USPC ........................................................ 704/233
See application file for complete search history.

(56) References Cited

U.S. PATENT DOCUMENTS

| | | | |
|---|---|---|---|
| 5,548,335 A | 8/1996 | Mitsuhashi et al. | |
| 6,748,088 B1* | 6/2004 | Schaaf | H04R 3/005 280/735 |
| 6,937,980 B2 | 8/2005 | Kransy et al. | |
| 7,024,366 B1 | 4/2006 | Deyoe et al. | |
| 7,716,047 B2 | 5/2010 | Hernandez-Abrego et al. | |
| 7,912,230 B2 | 3/2011 | Kawamura et al. | |
| 7,957,542 B2 | 6/2011 | Sarrukh et al. | |
| 8,300,845 B2 | 10/2012 | Zurek et al. | |
| 8,600,746 B1 | 12/2013 | Lei et al. | |
| 2004/0210945 A1* | 10/2004 | Snyder et al. | 725/135 |
| 2004/0260549 A1* | 12/2004 | Matsumoto | G10L 15/20 704/247 |
| 2006/0074686 A1* | 4/2006 | Vignoli | G10L 15/26 704/275 |
| 2006/0280312 A1 | 12/2006 | Mao et al. | |
| 2007/0038444 A1* | 2/2007 | Buck | B60R 16/0373 704/235 |
| 2007/0083374 A1 | 7/2007 | Bates et al. | |
| 2008/0232607 A1 | 9/2008 | Tashev et al. | |
| 2008/0240260 A1* | 10/2008 | Heidari | H04L 25/0222 375/260 |
| 2008/0259731 A1* | 10/2008 | Happonen | G10K 11/34 367/121 |
| 2009/0003623 A1* | 1/2009 | Burnett | 381/92 |
| 2010/0217590 A1* | 8/2010 | Nemer | G01S 3/8006 704/233 |
| 2010/0245624 A1 | 9/2010 | Beaucoup | |
| 2010/0323652 A1 | 12/2010 | Visser et al. | |
| 2011/0026722 A1* | 2/2011 | Jing et al. | 381/71.1 |
| 2011/0038389 A1 | 2/2011 | Visser et al. | |
| 2011/0066941 A1* | 3/2011 | Chipchase et al. | 715/716 |
| 2011/0080267 A1* | 4/2011 | Clare | G01S 13/82 340/10.4 |
| 2011/0153620 A1 | 6/2011 | Coifman | |
| 2011/0317041 A1* | 12/2011 | Zurek et al. | 348/240.99 |
| 2012/0134507 A1 | 5/2012 | Dimitriadis et al. | |
| 2012/0182429 A1 | 7/2012 | Forutanpour et al. | |
| 2014/0056435 A1 | 2/2014 | Kjems et al. | |
| 2014/0219471 A1* | 8/2014 | Deshpande | H04R 3/005 381/92 |
| 2014/0274218 A1* | 9/2014 | Kadiwala et al. | 455/570 |
| 2014/0301558 A1 | 10/2014 | Fan | |
| 2014/0350926 A1 | 11/2014 | Schuster et al. | |
| 2014/0350935 A1 | 11/2014 | Schuster et al. | |

OTHER PUBLICATIONS

"Tuning," downloaded from the internet on Oct. 11, 2012 at http://developers.voiceobjects.com/docs/en/VO9/004-tuning.htm, 12 pages.

Office Action issued in U.S. Appl. No. 13/649,747 dated Feb. 28, 2013, 14 pages.

Office Action issued in U.S. Appl. No. 13/649,747 dated Aug. 5, 2013, 9 pages.

Notice of Allowance issued on U.S. Appl. No. 13/649,747 dated Sep. 13, 2013, 6 pages.

Berkley et al., "Humanet: An Experimental Humanmachine Communications Network Based on ISDN Wideband Audio," AT&T Technical Journal, American Telephone and Telegraph Co. New York, vol. 69, No. 5, Sep. 1, 1990, pp. 87-99.

International Search Report and Written Opinion in International Application No. PCT/US2014/038537, dated Oct. 21, 2014, 13 pages.

The Notification of Reason for Rejection, and translation thereof, from counterpart Korean Application No. 10-2015-7036317, dated Jun. 29, 2017, 6 pp.

Examination Report from counterpart European Application No. 14730387.9, dated Apr. 20, 2017, 6 pp.

Office Action from counterpart Korean Application No. 10-2015-7036317 dated Dec. 19, 2016, 10 pp.

Response to Exam Report dated Apr. 20, 2017, from counterpart European Application No. 14730387.9, filed Aug. 4, 2017, 12 pp.

Notice of Allowance, and translation thereof, from counterpart Korean Application No. 10-2015-7036317, dated Nov. 10, 2017, 3 pp.

* cited by examiner

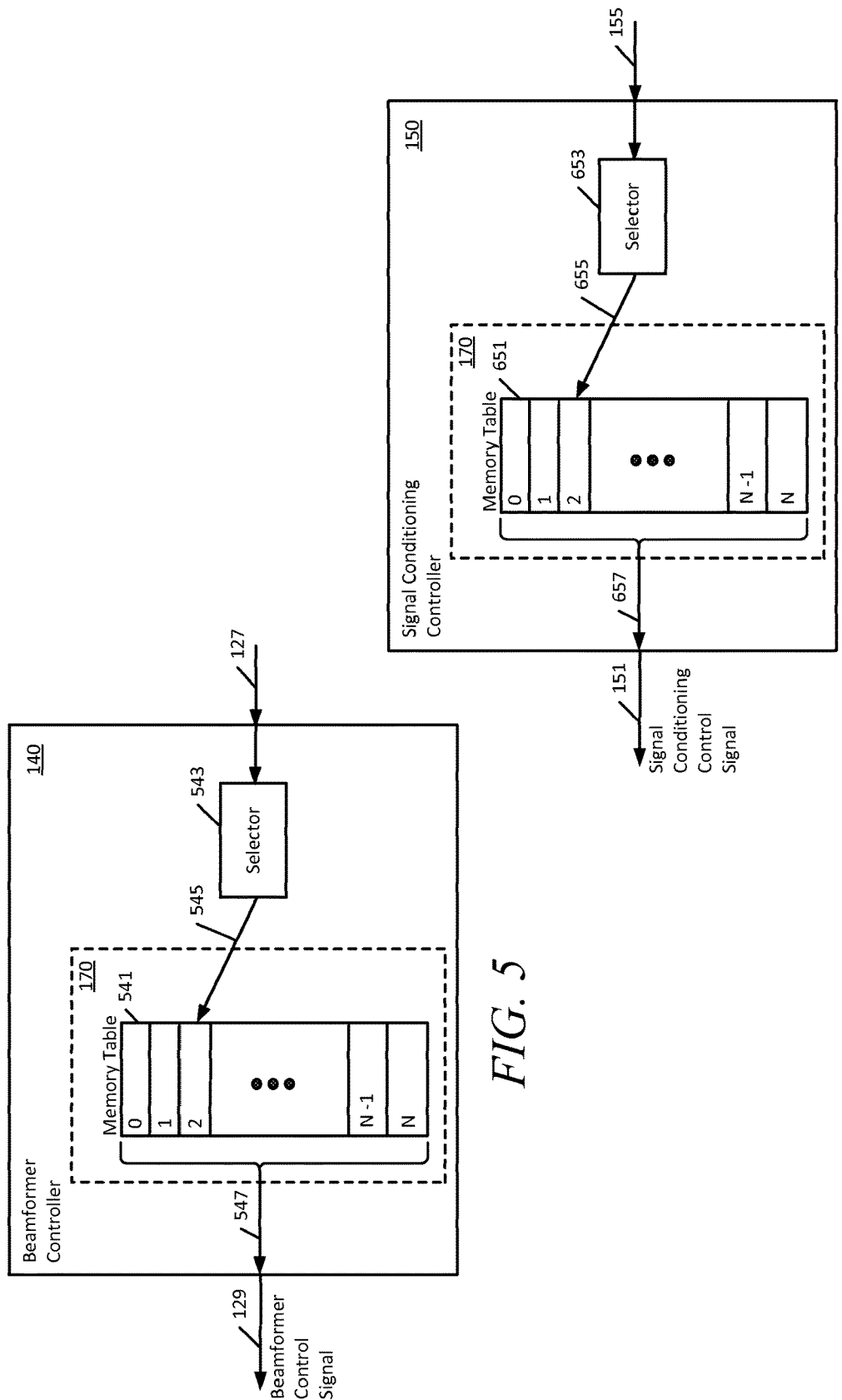

VOICE CONTROLLED AUDIO RECORDING SYSTEM WITH ADJUSTABLE BEAMFORMING

CROSS-REFERENCE TO RELATED APPLICATIONS

The present application claims priority to U.S. Provisional Patent Application No. 61/827,052, filed May 24, 2013, entitled "VOICE CONTROLLED AUDIO RECORDING SYSTEM WITH ADJUSTABLE BEAMFORMING," which is incorporated in its entirety herein, and which is assigned to the same assignee as the present application, and which is hereby incorporated by reference herein in its entirety.

FIELD OF THE DISCLOSURE

The present disclosure relates generally to beam forming and more particularly to voice recognition based control systems.

BACKGROUND

Various types of electronic devices such as mobile devices (video or audio recorders, smartphones, etc.) or stationary electronic devices (VCRs, televisions, home control systems, appliances, etc.) may include voice command recognition or more general voice recognition features for voice-to-text applications or for controlling features or aspects of the device. One example device and application is a video recording system which may include voice command recognition for controlling aspects of video capture. Many such systems that allow audio recording employ touch control mechanisms for control of audio recording. Many audio transmission systems however may not have any mechanism for control related to audio and only "pick-up" audio by way of microphones. With respect to recording, recording audio scenes effectively with a portable device often requires a high degree of user control in which case touch control mechanisms can be cumbersome when trying to simultaneously capture a video scene. Further, existing portable audio recorders do not provide many real time adjustable recording parameters to the user.

System microphones can be configured such that one of the microphones may provide an audio control channel. For example, one directional microphone may be used to capture user commands thereby serving as an audio control channel, while one or more additional microphones may be configured to capture audio from the direction of a video scene. In some existing systems, the audio emanating from the audio control channel is subtracted from the overall audio signal so as to eliminate or reduce it from the desired audio to be recorded which is emanating from the video scene. Such systems may eliminate or attenuate all audio input to the directional microphone being used to capture user commands.

BRIEF DESCRIPTION OF THE DRAWINGS

FIG. 5 is a schematic block diagram of a beamformer controller in accordance with an embodiment.

FIG. 6 is a schematic block diagram of a signal conditioning controller in accordance with an embodiment.

DETAILED DESCRIPTION

Figure 1A:
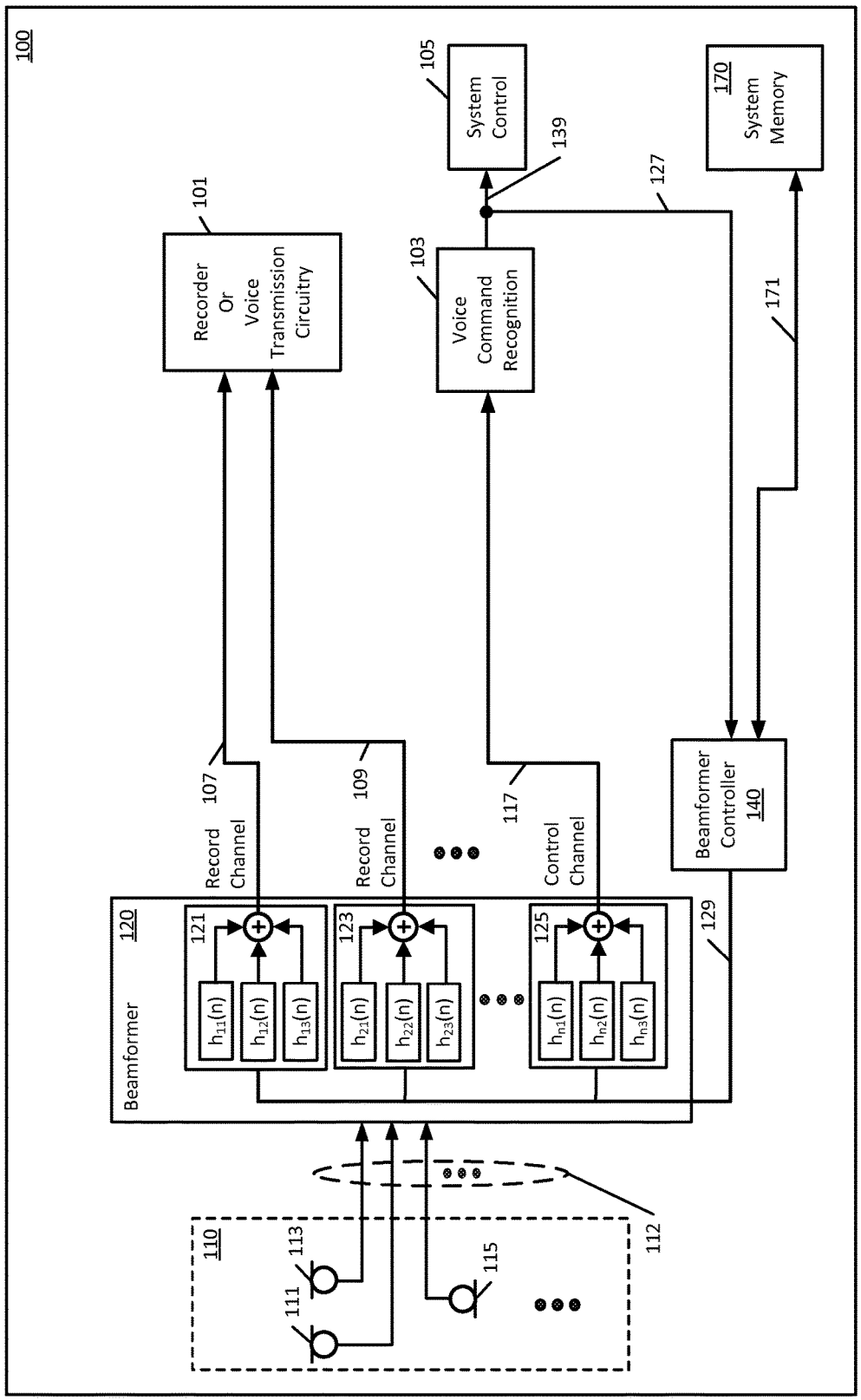
FIG. 1A is a schematic block diagram of a voice controlled audio recording or transmission apparatus with adjustable beamforming in accordance with an embodiment.

The various disclosed embodiments enable user control and user-definable audio recording attributes through user voice command control. In one embodiment, an adjustable audio beamformer defines a virtual microphone for at least one audio recording channel and for at least one audio control channel that is itself controllable by voice command control. The embodiments utilize an array of microphones and may use single microphone outputs or may use beamforming to define virtual microphones where the virtual microphones pick up sound for respective audio channels with one or more audio recording channels and at least one audio control channel. Some embodiments may remove command words from the recorded audio but can still utilize desired audio received over the audio control channel.

One disclosed method of operation includes obtaining a plurality of audio channels using a plurality of microphone outputs where the audio channels include at least one audio recording channel and at least one audio control channel. The method of operation performs voice recognition on the audio control channel to detect voice commands for controlling audio channel attributes. Upon detection of a voice command for controlling an audio channel attribute, the method includes adjusting a corresponding audio channel attribute. The audio channel attribute adjustment may be accomplished in various ways. For example, an audio channel attribute may be adjusted by controlling a beamformer to modify a beamform corresponding to an audio channel. In another example, an audio channel attribute may be adjusted by controlling signal conditioning applied to an audio channel. In the various embodiments, audio attributes of either an audio recording channel or an audio control channel may be controlled and accordingly adjusted. In one embodiment, the method of operation includes beamforming a plurality of microphone outputs to obtain a plurality of virtual microphone audio channels with at least one audio recording channel and at least one audio control channel, performing voice recognition on the at least one audio control channel to detect voice commands for controlling audio recording channel attributes of the at least one audio recording channel, and adjusting an attribute of the at least one audio recording channel in response to detecting a voice command for controlling audio recording channel attributes. Adjusting an attribute of the at least one audio recording channel may be accomplished by, for example, controlling an adjustable beamformer by adjusting at least one parameter of the adjustable beamformer.

The detection of voice commands for controlling audio recording channel attributes may include detecting voice commands for controlling audio sensitivity zooming, panning in a specified direction, focusing on a specified direction, blocking a specified direction, mixing a narrator's voice, blocking a narrator's voice, or reducing background noise.

The method of operation may include controlling audio recording channel signal conditioning including, but not limited to, controlling a signal conditioner by adjusting at least one parameter of the signal conditioner. The method of operation may include controlling the adjustable beamformer, in some embodiments, by changing filter coefficients of a beamformer filter providing the at least one audio recording channel.

In some embodiments, the methods of operation may include operating and controlling filter logic to reduce or eliminate command words from a recording channel. One example method of operation of filter logic includes providing the at least one audio control channel as an adaptive filter input, activating the adaptive filter in response to detecting a voice command, obtaining a summation block output by subtracting an output of the adaptive filter from the at least one audio recording channel and providing the summation block output as feedback to the adaptive filter and as the at least one audio recording channel to a recorder.

Another example method of operation of filter logic includes providing the at least one audio control channel as an adaptive filter input, obtaining a first summation block output by subtracting an output of the adaptive filter from the at least one audio recording channel, providing the first summation block output as feedback to the adaptive filter, providing the first summation block output to a first multiplier along with a detected voice command, providing the at least one audio recording channel as an input to a second multiplier along with the detected voice command, obtaining a second summation block output by adding the first multiplier output to the second multiplier output and providing the second summation block output as the at least one audio recording channel to a recorder.

The above methods of operation of filter logic may include delaying the at least one audio control channel, and providing the delayed at least one audio control channel as the adaptive filter input, and delaying the at least one audio recording channel and providing the delayed at least one audio recording channel to the summation block.

An apparatus is also disclosed that is operative to, among other things, perform the various disclosed methods of operation. In one example embodiment, an apparatus includes a beamformer, operatively coupled to a plurality of microphone outputs. The beamformer is operative to provide outputs including a plurality of virtual microphone audio channels with at least one audio recording channel and at least one audio control channel. The apparatus includes voice command recognition logic that is operatively coupled to the beamformer. The voice command recognition logic is operative to receive the at least one audio control channel, and to perform voice recognition to detect voice commands for controlling audio recording channel attributes of the at least one audio recording channel. A beamformer controller is operatively coupled to the beamformer and to the voice command recognition logic. The beamformer controller is operative to adjust at least one parameter of the beamformer in response to detection of a voice command by the voice command recognition logic. Various detected voice commands control audio recording channel attributes.

In some embodiments, the beamformer includes a plurality of filters, operatively coupled to the plurality of microphone outputs. The beamformer controller is operative to adjust at least one parameter of the beamformer by changing a filter coefficient of at least one filter of the beamformer.

The voice recognition logic may be operative to detect voice commands for controlling audio recording channel attributes including audio sensitivity zooming, panning in a specified direction, focusing on a specified direction, blocking a specified direction, mixing a narrator's voice, blocking a narrator's voice, or reducing background noise.

In some embodiments, the apparatus may include a signal conditioner with a noise suppressor. The signal conditioner is operatively coupled to the voice recognition logic and to the beamformer to receive the plurality of virtual microphone audio channels as inputs. The signal conditioner provides a plurality of corresponding outputs corresponding to each virtual microphone audio channel input. A signal conditioner controller is operatively coupled to the voice recognition logic and to the signal conditioner, and is operative to adjust an attribute of the at least one audio recording channel in response to detecting a voice command for controlling audio recording channel attributes. Specifically, the signal conditioner controller may adjust at least one parameter of the signal conditioner.

The disclosed apparatus also includes filter logic operatively coupled to the beamformer outputs, and a recorder, operatively coupled to the filter logic to receive the at least one audio recording channel as an output from the filter logic.

In one example embodiment, the filter logic may include an adaptive filter, having an adaptive filter input operatively coupled to the at least one audio control channel. The filter logic includes summation logic with a first input operatively coupled to the at least one audio recording channel, and with a second input operatively coupled to the adaptive filter output. The summation logic output is operatively coupled to the recorder. A first switch is operatively coupled to the adaptive filter and to the voice recognition logic, and is operative to activate the adaptive filter in response to a voice command detection signal received from the voice recognition logic. A second switch is operatively coupled to the summation logic output, to the at least one audio recording channel and to the recorder. The second switch is further operatively coupled to the voice recognition logic to receive a voice command detection signal. That is, the second switch is operative to switch the recorder input from the at least one audio recording channel to the summation logic output, in response to a voice command detection signal received from the voice recognition logic.

In another embodiment, the filter logic includes an adaptive filter with an adaptive filter input operatively coupled to the at least one audio control channel and summation logic with a first input operatively coupled to the at least one audio recording channel and with a second input operatively coupled to the adaptive filter output. The summation logic output is operatively coupled to an adaptive filter adjustment input in a feedback loop. Mixing logic is also operatively coupled to the summation logic output and to the at least one audio recording channel.

The mixing logic includes a first multiplier, operatively coupled to the at least one audio recording channel and to the voice command recognition logic, a second multiplier, operatively coupled to summation logic output and to the voice command recognition logic, and mixer summation logic, operatively coupled to outputs of the first multiplier and the second multiplier and to the recorder.

The various embodiments of filter logic also include a first delay, operatively coupled to the at least one audio recording channel and to the summation logic, and a second delay, operatively coupled to the at least one audio control channel and to the adaptive filter input.

Turning now to the drawings, FIG. 1A is a schematic block diagram of a voice controlled audio recording or transmission apparatus 100 with adjustable beamforming in accordance with an embodiment. It is to be understood that FIG. 1A and other schematic block diagrams provided herein are limited to showing only those components useful to describe the features and advantages of the various embodiments, and to describe how to make and use the various embodiments to those of ordinary skill. It is therefore to be understood that various other components, circuitry, and devices etc. may be present in order to implement an apparatus and that those various other components, circuitry, devices, etc., are understood to be present by those of ordinary skill. For example, an apparatus may include inputs for receiving power from a power source, a power distribution bus, communication buses for sending control signals or other information between operatively coupled components, etc. Thus it is to be understood that such various other components, circuitry, or devices are omitted for the purpose of clarity.

The various components, circuitry, devices etc. described with respect to the figures including, but not limited to, those described using the term "logic," may be implemented in various ways such as by software and/or firmware executing on one or more programmable processors such as a central processing unit (CPU) or the like, or by ASICs, DSPs, FPGAs, hardwired circuitry (logic circuitry), or any combinations thereof.

The terminology "operatively coupled" as used herein refers to coupling that enables operational and/or functional communication and relationships between the various components, circuitry, devices etc. described as being operatively coupled and may include any intervening items (i.e. buses, connectors, other components, circuitry, devices etc.) used to enable such communication such as, for example, data communication buses or any other intervening items that one of ordinary skill would understand to be present. Also, it is to be understood that other intervening items may be present between "operatively coupled" items even though such other intervening items are not necessary to the functional communication facilitated by the operative coupling. For example, a data communication bus may be present in various embodiments and may provide data to several items along a pathway along which two or more items are operatively coupled, etc. Such operative coupling is shown generally in the figures described herein.

In FIG. 1A a voice controlled audio recording or transmission apparatus 100 in accordance with an embodiment is shown that may be included in a device such as, but not limited to, a video camera, smartphone, tablet computer, laptop, portable audio recorder, home appliances, or some other electronic device, etc. In the apparatus 100, a group of microphones 110 provide microphone outputs 112 that are operatively coupled to an adjustable beamformer 120. Some of the microphones may be directional microphones and some may be omnidirectional in the various embodiments. Although not shown for purposes of clarity, the microphone outputs 112 may be processed through an analog-to-digital converter (ADC) and may also be subjected to other "pre-conditioning" prior to the beamformer 120 such as amplification, filtering, etc., and these components are understood to be present. The beamformer 120 is an adjustable beamformer in that, for example, in some embodiments, various beamforms may be created by changing (i.e. adjusting) filter coefficients of one or more beamformer filters 121, 123, 125, etc. The created beamforms may correspond to "virtual microphones" that may utilize physical microphone outputs 112 from one or more physical microphones 111, 113, 115, etc. The virtual microphones thus may provide various virtual microphone audio channels such as one or more audio recording channels and one or more audio control channels. The beamformer filters 121, 123, and 125, etc., are therefore adjustable filters. However, in some embodiments, the beamformer 120 filters may also be adaptive filters such that the beamform 120 may be an adaptive beamformer. Although the example of FIG. 1A, shows the group of microphones 110 as including three microphones 111, 113 and 115, any number of microphones may be used in the embodiments. In accordance with the embodiments, the beamformer 120 receives audio signals from the microphone outputs 112 and may perform beamforming to create various virtual audio channels that include at least one audio record channel and at least one audio control channel. The beamformer 120 can also be bypassed such that each audio channel corresponds to a single one of the microphone outputs 112. Therefore in one example in which the beamformer 120 is not used, audio output channel 107 may correspond to microphone 111, audio output channel 109 may correspond to microphone 113 and control channel 117 may correspond to microphone 115. In another example where the beamformer 120 is used, the beamformer 120 may beamform the microphone outputs 112 from two or more microphones in various combinations to provide various virtual audio channels including audio output channels 107 and 109, and control channel 117 as outputs. Therefore the audio channels may be audio channels that correspond to single microphone outputs, or may be virtual audio channels formed by beamforming the microphone outputs from two or more microphones. Combinations of both virtual audio channels and single microphone outputs may also be output by the beamformer 120 in some embodiments. In other words, the beamformer 120 may pass through some of the microphone outputs 112 without any beamforming applied.

In one example, audio output channel 107 and audio output channel 109 may be virtual audio channels created by beamforming, and control channel 117 may correspond to the physical microphone output from only a single microphone such as microphone 115.

Figure 7:
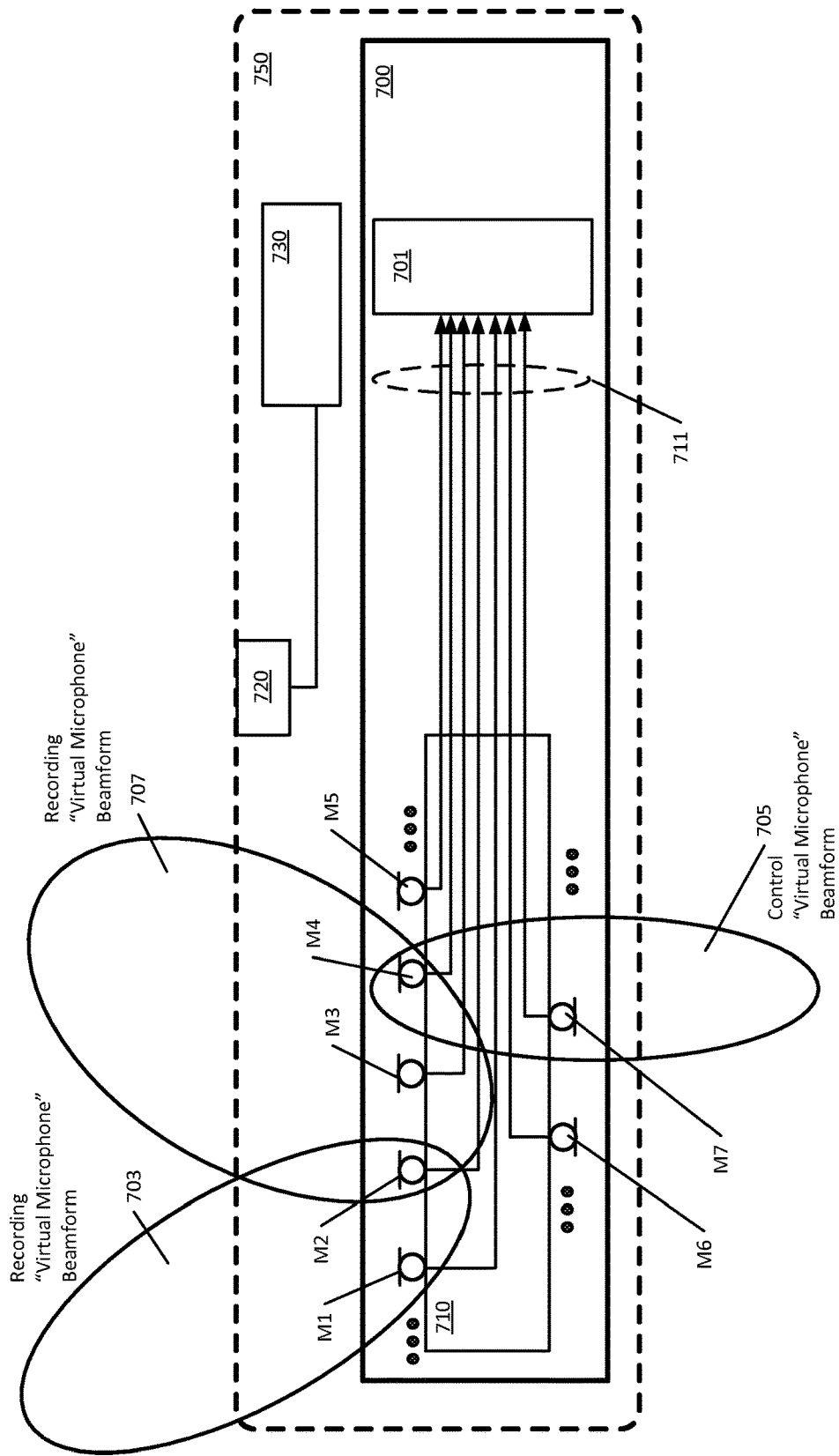
FIG. 7 is a schematic block diagram of a microphone array configured to provide a recording zone virtual microphones and a control zone virtual microphone in accordance with various embodiments.

The beamformer 120 creates the virtual audio channels by applying appropriate filtering algorithms and changing filter coefficients of one or more of the adjustable filters 121, 123 or 125, etc., accordingly to generate beamforms that correspond to the virtual audio channels. In one example, sound received by microphones 111 and 113 may be combined and appropriately filtered to create a single "virtual microphone" that receives sound from a given direction. As mentioned above, the group of microphones 110 may include several microphones (i.e. a microphone array) such that one or more virtual microphones may be created using one or more of the physical microphone outputs and applying beamforming techniques. That is, the created virtual microphones may be directed via corresponding beamforms in order to focus in any given direction such as to focus on specific voices, sounds, etc. Therefore, one example application of the apparatus 100 is for a video recorder where the apparatus 100 may be used to create one or more virtual microphones to pick up sound coming from the direction of the video scene while another virtual microphone may pick up sound in a direction where the operator, (i.e. the controlling user or a narrator, etc.) is located. One example beamform pattern is shown in FIG. 7 which is described in detail herein further below.

The example beamformer 120 includes various filters such as filter 121 which provides the audio output channel 107, filter 123 which provides the audio output channel 109 and filter 125 which provides the control channel 117. As shown in FIG. 1A, the beamformer 120 may have any number of filters and is not limited to the filters 121, 123 and 125. Likewise, the number of virtual audio output channels is not limited to audio output channels 107 and 109. Other control channels in addition to control channel 117 may also be present in the various embodiments. The filters 121, 123 and 125 are adjustable filters and, in some embodiments, may be adaptive filters. Further in some embodiments, the filters may be finite impulse response (FIR), infinite impulse response (IIR) filters or some other type of adaptive filter. Additionally, in some embodiments, outputs from one or more filters may be combined, or summed, to create a virtual audio channel. That is, in accordance with the embodiments, any appropriate filter configuration may be implemented within the beamformer 120.

Thus the example apparatus 100 includes an adjustable beamformer 120 that provides two audio output channels 107 and 109 (or more) to a recorder or voice transmission circuitry 101 that is operatively coupled to the beamformer 120. The two audio output channels 107 and 109 may be either audio recording channels, audio or voice transmission channels or both because they may be provided to either a recorder, voice transmission circuitry, or both in various embodiments of the apparatus 100. A recorder may be an audio recorder that creates storable audio files that may be stored in a memory or remotely. Voice transmission circuitry may be a wire line or wireless transceiver that transmits voice over any suitable network such as, but not limited to, a telephone system, or wireless wide area network, local area network, etc. The voice transmission circuitry may include additional signal processing, transceivers and/or applications used for voice transmission such as a VoIP application in some embodiments. In some embodiments both a recorder and voice transmission circuitry may be present in the apparatus, however some embodiments may include only one or the other. The beamformer 120 is also operatively coupled to voice command recognition logic 103 to provide control channel 117. The voice command recognition logic 103 is in turn operatively coupled to system control 105 to provide a control signal 139. The control signal 139 is based on, or derived by, command words or command phrases detected or recognized on the control channel 117 by the voice command recognition logic 103. The system control 105 may be a video system control in some embodiments, but may be any type of voice controllable system control such as, but not limited to, software application control, tablet computer control, laptop control, home appliance control, mobile communication device control such as for a smartphone, voice recorder control or some other type of control etc. A beamformer controller 140 is operatively coupled to the voice command recognition logic 103 and receives its output as control signal 127. The beamformer controller 140 is also operatively coupled to the beamformer 120 to provide control signal 129, and to system memory 170 via memory interface 171. The beamformer controller 140 is operative to respond to command words or command phrases, recognized by the voice command recognition logic 103, that are related to control of audio attributes of the audio output channels 107 and 109. An audio attribute relates to some quality or character of an audio signal that can be adjusted by application of certain audio signal conditioning/signal processing. Such attributes include both directional properties such as stereo separation and directivity, and non-directional properties such as frequency response. For example, the apparatus 100 operator may command the beamformer 120 to change the direction of the beamform using commands such as "focus left", "focus right", "focus forward" (or "focus ahead"), etc. In response to these or similar voice commands, the beamformer controller 140 will accordingly adjust one or more of the filters 121, 123 or 125 to fulfill the command. In some embodiments, the beamformer controller 140 may access system memory 170 to obtain predetermined filter coefficient settings related to beamforms corresponding to given commands. For example, a set of predetermined filter coefficients may be stored in system memory 170 for beamforms focused in various directions ("left", "right", "up", "down", "straight ahead", etc.) that may be accessed by the beamformer controller 140 in response to corresponding commands. That is, the beamformer controller 140 receives the voice commands via control signal 127 and, in response, adjusts the beamformer 120 accordingly, which may be accomplished by providing appropriate filter coefficients to one or more of the filters 121, 123 and 125 in order to change the beamform (or beamforms) generated.

Figure 1B:
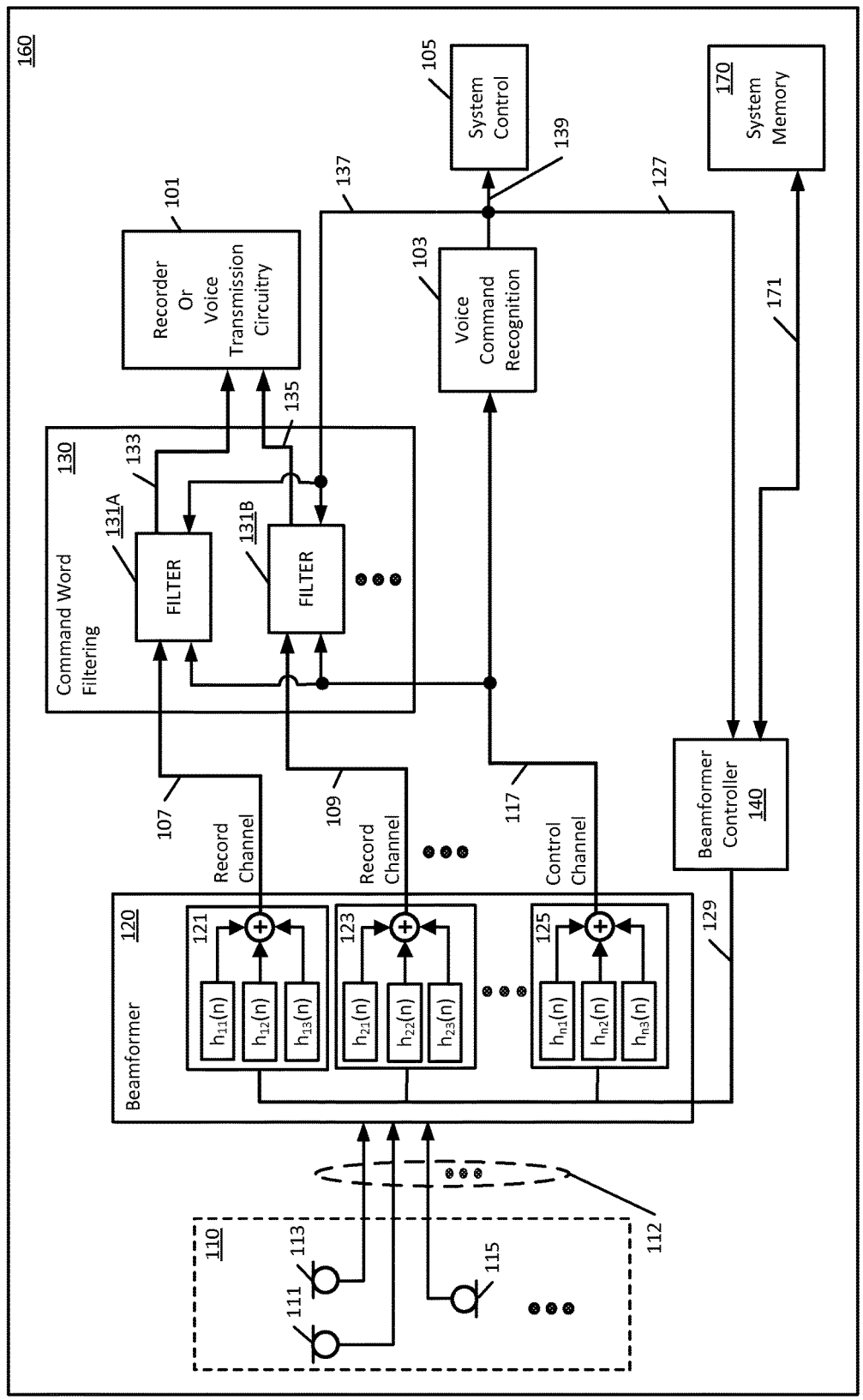
FIG. 1B is a schematic block diagram of a voice controlled audio recording or transmission apparatus with adjustable beamforming in accordance with another embodiment.

In FIG. 1B, an apparatus 160, in accordance with another embodiment, includes the beamformer 120 which is operatively coupled to command word filtering logic 130 and to the voice command recognition logic 103. The voice command recognition logic 103 is operatively coupled to the command word filtering logic 130 and to system control 105, which, as discussed above, may be any type of voice controllable system control. The voice command recognition logic 103 is further operatively coupled to the beamformer controller 140 and provides the control signal 127 in response to detecting voice commands related to control of audio attributes. The beamformer controller 140 is operatively coupled to the beamformer 120, and provides the control signal 129 to adjust one or more attributes that adjust the beamformer 120. For example, the control signal 129 may control attributes of the filters 121, 123 or 125, etc., to change the configuration of virtual microphones or redirect the virtual microphone beams, (i.e. the beamforms) etc., or to adjust some other audio attribute.

Although not shown in FIG. 1A or FIG. 1B for purposes of clarity, the apparatus 100 and apparatus 160, respectively, may also include various signal conditioning and other signal processing, such as noise suppression, gain, equalization, automatic gain control, etc., which may be operatively coupled to the beamformer 120 at either the beamformer 120 inputs, or outputs. Such signal conditioning may be distributed and some may be applied prior to beamformer 120 and some after beamformer 120. Signal conditioning or signal processing functions such as, but not limited to, signal amplification, analog-to-digital conversion/digital audio sampling, etc., are also applied to the physical microphone outputs 112 prior to the beamformer 120, but are not shown in FIG. 1A or FIG. 1B for purposes of clarity as such items are understood to be present.

In the example apparatus 160, the audio output channel 107 and audio output channel 109 are input to the command word filtering logic 130 which includes a group of filter logic blocks such as filter logic 131A and filter logic 131B. Each virtual record channel that is output by beamformer 120 will have a corresponding filter logic block in the command word filtering logic 130. In apparatus 160, the command word filtering logic 130 is operatively coupled to the recorder or voice transmission circuitry 101. For example, filter logic 131A provides an audio output channel as recorder input 133 to the recorder or voice transmission circuitry 101 and filter logic 131B provides another audio output channel as input 135 to the recorder or voice transmission circuitry 101. Filter logic 131A and filter logic 131B filter voice command words or voice command phrases from their corresponding audio output channels in response to voice command words or voice command phrases detected by the voice command recognition logic 103. Although the beamformer 120 applies beamforming to provide "clean" audio output channels, some residual command word audio may still be present in the recording. Also, in some instances beamforms may overlap such as when the operator moves into the recording area such that the control channel beamform overlaps with one or more recording channel beamforms. In such instances, command word audio will be picked up by the recording channels. Thus, the command word filtering logic 130 may eliminate residual command word audio that remains subsequent to beamforming, or may eliminate command words from the recording channel when the operator is physically located within an audio recording scene.

The control channel 117 is input to the voice command recognition logic 103 which provides the control signal 139 to system control 105. As discussed above, the system control 105 may be any suitable system control such as, but not limited to, a video recorder system control, etc. The voice command recognition logic 103 is also operatively coupled to the command word filtering logic 130 to provide a control signal 137 to filter logic 131A and filter logic 131B.

The beamformer controller 140 receives control signal 127 from the voice command recognition logic 103 when the voice command recognition logic 103 detects or recognizes voice command words or phrases. In response to detection of voice command words related to adjustment of audio attributes according to the control signal 127, the beamformer controller sends the beamformer control signal 129 to the beamformer 120 and may control various parameters of one or more of the filters 121, 123 and 125. By controlling the filters 121 123 and 125, the beamformer 120 may beamform the sound received by each of the microphones 111, 113 and 115, to create virtual microphones and corresponding virtual audio channels. That is, sound received by various physical microphones may be combined in various ways to form virtual microphones that may be reconfigured by voice command in accordance with the various embodiments. For example, virtual microphones may be controlled by user voice commands to focus on a given direction, amplify a specific voice or sound, pan across a scene, or etc. The voice command recognition logic 103 is operative to detect voice commands for controlling audio recording channel attributes such as, but not limited to, audio sensitivity zooming, widening stereo image, equalization, automatic gain control, compression, panning in a specified direction, focusing on a specified direction, blocking a specified direction, mixing a narrator's voice, blocking a narrator's voice, or reducing background noise, etc.

The virtual control channel may be created using beamforming where the virtual microphone is configured to pick up sound from a certain position with respect to the apparatus 100 or apparatus 160 depending on the embodiment. More particularly, an audio virtual control channel may be created that is directed towards the operator of a device that includes the apparatus. Command word utterances are detected on the virtual control channel by the voice command recognition logic 103 and acted upon appropriately, while command word utterances occurring on the virtual audio output channels are ignored. That is, in one example, if a subject being recorded by a virtual microphone (on a corresponding virtual record channel) uttered a word that is also a command word, that command word will be ignored since it did not occur on the virtual control channel. In accordance with the embodiments, the operator of apparatus 100 or apparatus 160 may command the system to redirect the virtual control channel as the operator moves about the scenery. For example, when a recording device that has the apparatus 100 or 160 is left stationary, such as when a video recorder is fixed on a tripod etc., the operator is free to move about the scene. The operator may use voice commands such as "control channel front right" to redirect the control channel to the front of the video camera and to the right side with respect to a point of reference. The point of reference may be defined with respect to the apparatus 100 or apparatus 160, or with respect to a device that includes that apparatus. For example, where the device is a video recorder, the point of reference may be defined with respect to a video scene or with respect to the rear of the video recorder etc. The operator may therefore be located within the scene, and continue to use voice commands to make adjustments to other audio attributes. Likewise if the apparatus 100 or apparatus 160 is incorporated into a stationary device, such as a home environment control system, the operator may inform the apparatus of her location. For example, the operator may sit on the "left" or "right" side of the living room (or alternatively "north", "south", "east", "west" or some other references) and may command the home environment control system to focus the control channel to the location where the operator is sitting.

As mentioned above, an example of beamforms that form virtual microphones and corresponding virtual audio channels and how they may be configured to receive audio from various directions is provided in FIG. 7. In FIG. 7, an apparatus 700 in accordance with an embodiment may be included in a portable device 750 such as, but not limited to, a video recorder. The apparatus 700 includes an audio recording system 701 that includes at least a beamformer and a beamformer controller in accordance with an embodiment. A group of microphones 710 or microphone array is operatively coupled to the audio recording system 701 and provides microphone outputs 711, with one output for each physical microphone M1 through M7. Additional microphones may also be present in the microphone array in some embodiments. The example portable device 750 includes a camera 720 and a video recording system 730. In the present example, a recording zone "virtual microphone" beamform 703 may be defined with respect to the position of the camera 720 and an operator located behind the portable device 750, i.e. behind the camera 720 which in FIG. 7 is oriented toward the bottom of the figure. Thus the beamform 703 may be considered to be directed toward the "left" of a video scene captured by camera 720, from the perspective of the portable device 750 operator. The beamform 703, which defines one recording channel "virtual microphone" may be formed using physical microphones M1 and M2 as shown by the surrounding ellipse which represents beamform 703. That is, a single "virtual microphone" represented by example beamform 703 is created by beamforming the output signals 711 from physical microphone M1 and physical microphone M2. Similarly, an example control zone virtual microphone is formed by beamform 705 which is directed toward the back of the portable device 750 (and thus behind the camera 720), and toward the operator. The example beamform 705 is created by beamforming the audio signals from physical microphone M4 and physical microphone M7. Another beamform 707 may be considered to be directed toward the "right" of a video scene captured by camera 720 and is created by beamforming the audio signals from physical microphones M2, M3 and M4 as shown. Therefore, it is to be understood that any combination of microphones from the group of microphones 710 may be used to form beamforms and corresponding various virtual audio channels. In accordance with the embodiments, the operator may use voice commands to change the configuration of virtual microphones, or to utter commands that result in changes to the virtual microphone configuration. For example, the operator may cause the control zone to move to the front of portable device 750 or to direct to the left or right, etc. The example beamforms 703, 705 and 707 are shown as ellipses for purposes of illustration only and for clarity; however it is to be understood that the actual beamforms are not actually elliptical. Those skilled in the art will appreciate that the beamforms 703, 705 and 707 may have any of various beamform patterns such as cardioid, dipole, hypercardioid, supercardioid, etc. Alternately, higher order directional beamform patterns may be used.

Figure 2:
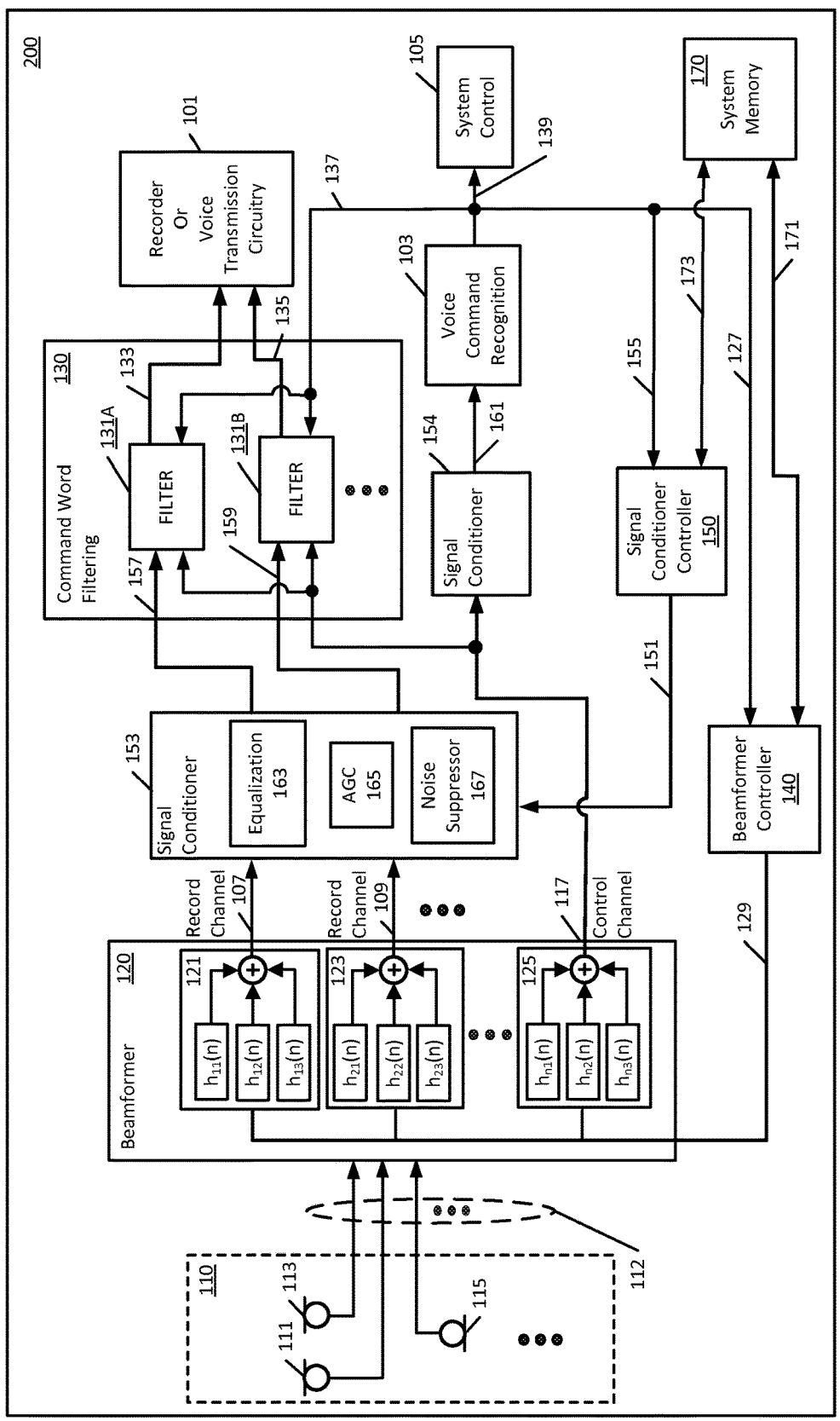
FIG. 2 is schematic block diagram of a voice controlled audio recording or transmission apparatus with adjustable beamforming and adjustable signal conditioning in accordance with another embodiment.

Turning to the schematic block diagram of FIG. 2, an apparatus 200 includes a voice controlled audio recording system with adjustable beamforming and also includes a signal conditioner controller 150 in accordance with another embodiment. As discussed above with respect to FIG. 1A and FIG. 1B, a signal conditioner 153 may be located prior to the beamformer 120, or subsequent to the beamformer 120 as shown in FIG. 2. However, in some embodiments, the signal conditioner 153 may be distributed and may have some signal conditioner processes prior to the beamformer 120 and some signal conditioner processes subsequent to the beamformer 120. Also, as discussed with respect to the example apparatus 100 shown in FIG. 1A and the example apparatus 160 shown in FIG. 1B, the example apparatus 200 shown in FIG. 2 also includes signal amplification, analog-to-digital conversion/digital audio sampling, etc., that is applied to the physical microphone outputs 112 prior to the beamformer 120 and which are not shown in FIG. 2 for purposes of clarity as such components are understood to be present by those of ordinary skill.

The embodiment illustrated by the example apparatus 200 shown in FIG. 2 includes the signal conditioner 153 which is operatively coupled to the beamformer 120, to the command word filtering logic 130 and to the voice command recognition logic 103. As mentioned above it is to be understood however that the signal conditioner 153 could also be located prior to the beamformer 120 and therefore may be operatively coupled to the microphone outputs 112 and may provide the conditioned microphone outputs to the beam former 120 in some embodiments. In the example embodiment of FIG. 2, audio output channel 107, audio output channel 109 and control channel 117 are input to the signal conditioner 153. The signal conditioner 153 is operatively coupled to the voice command recognition logic 103 to provide a conditioned control channel 161 as an input to the voice command recognition logic 103. A signal conditioner controller 150 is operatively coupled to the signal conditioner 153 and to the voice command recognition logic 103. The signal conditioner 153 includes components such as, but not limited to, equalization 163, automatic gain control (AGC) 165 and a noise suppressor 167. Any of these signal conditioning components may be applied to the audio output channels as needed or as required and in any order or sequence. A separate signal conditioner 154 is operatively coupled to the beamformer 120 to receive the control channel 117 and provides the conditioned control channel 161 to the voice command recognition logic 103. That is, the voice command recognition logic 103 may have different noise suppression requirements than those required for audio recording. For example, non-linear signal conditioning may be applied by the signal conditioner 154 while linear signal conditioning may be applied by the signal conditioner 153. It is to be understood that in some embodiments, the signal conditioner 153 and signal conditioner 154 may be integrated together, however, the signal conditioning applied to the audio control channel 117 will still be different than the signal conditioning applied to audio recording channels. Furthermore, unlike signal conditioning for the audio output channels, the signal conditioning applied to the audio control channel 117 may not be subject to user control. However, directionality audio attributes of the control channel 117 are subject to user control by way of beamformer controller 140 and the beamformer 120.

The signal conditioner controller 150 receives control signal 155 from the voice command recognition logic 103 when the voice command recognition logic 103 detects voice command words or phrases. In response to detection of voice command words related to adjustment of audio attributes according to the control signal 155, the signal conditioner controller 150 sends the signal conditioner control signal 151 to the signal conditioner 153 and may control any of various audio attributes related to various audio enhancement functions. The signal conditioner 153 may include various audio enhancement functions such as, but not limited to, equalization 163, automatic gain control (AGC) 165, noise suppressor 167, reverb, various sound effects, etc. These audio enhancement functions may be applied as needed, on a per-channel basis and in any suitable order and combination.

The signal conditioner 153 provides a conditioned output, corresponding to each signal conditioner 153 input. That is, it is to be understood that the signal conditioning applied to audio output channel 107 and audio output channel 109 may be different based on the specific requirements for each record channel. In other words, because the audio environments encountered for sound received by the virtual microphone beamform corresponding to the record channel may be different, likewise the signal conditioning required to correct for the audio environment must be different. For example, noise may be present on one channel that is not present on the other. Each conditioned output is provided to a filter logic block of the command word filtering logic 130. For example, signal conditioner 153 provides conditioned record channel 157 to filter logic 131A and provides conditioned record channel 159 to filter logic 131B. The conditioned control channel 161 from signal conditioner 154 is input to the voice command recognition logic 103. It is to be understood that in some embodiments, signal conditioning of the audio output channels may be performed after recording, that is post-recording. For example, turning briefly to FIG. 1A, audio output channel 107 and audio output channel 109 may be recorded by recorder or voice transmission circuitry 101 without any signal conditioning. The signal conditioning which may include automatic gain control, de-reverberation, noise suppression, equalization, etc. may be applied to a recorded file at some later time. Also, in some embodiments, command word filtering may also be applied to a recorded file post-recording by using time stamps incorporated into the recorder data (i.e. into the recorded file or a recorded control file). In some embodiments, the control channel 117 may also be recorded, either along with the recorded file or in a recorded control file, for use in post-recording processing of a recorded file. For example, command words may indicate points in a recorded file where certain post-recording signal conditioning should be applied. In one example, the operator may use commands such as, but not limited to, "suppress wind noise," "suppress left side audio," "suppress right side audio," "amplify right," "amplify left," etc. or may also specify values such as "suppress by N dB where "N" is an integer representing a dB value, etc. The operator may also specify a time value so that, by using time stamps in the recorded file, signal conditioning may be applied for some number of seconds before or after initiation of a given command word.

Thus in FIG. 2, the beamformer controller 140 is operative to adjust directivity-oriented audio attributes by controlling the adjustable beamformer 120. Examples of adjusting directivity-oriented audio attributes include, but are not limited to, audio sensitivity zooming, panning in a desired direction, blocking a specific direction, mixing a narrator's voice, blocking a narrator's voice, widening a stereo image, improving signal to noise ratio, etc. The signal conditioning controller 150 is operative to adjust non-direction oriented audio attributes by controlling the signal conditioner 153. Examples of adjusting non-direction oriented audio attributes include, but are not limited to, equalization, gains, automatic gain control, compression, reverb, noise-gating, noise suppression, other audio effects, etc.

Figure 8:
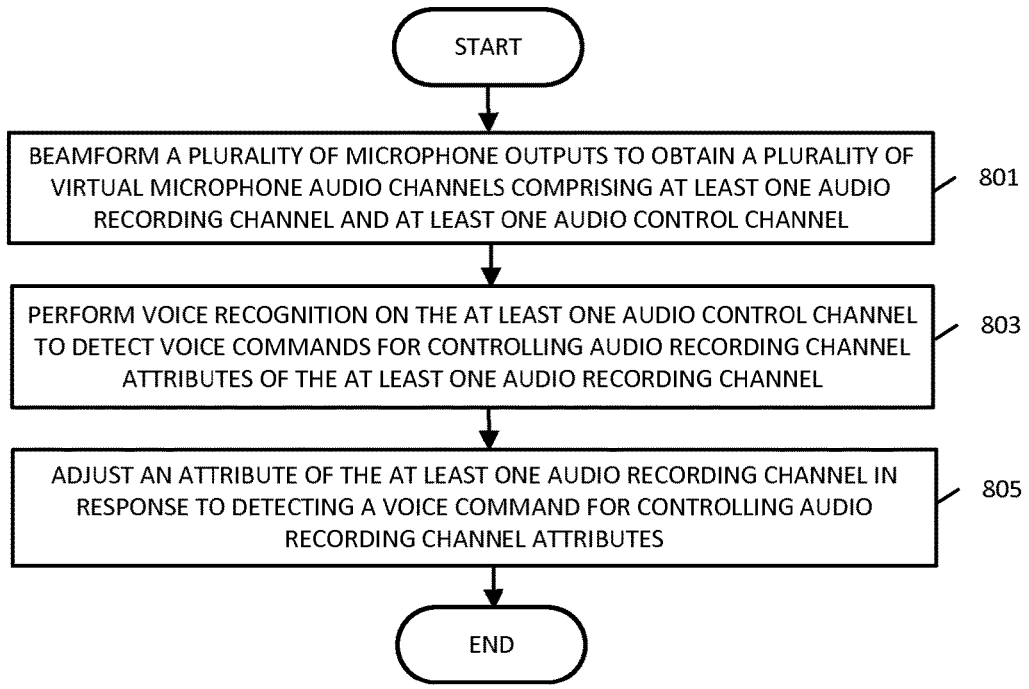
FIG. 8 is a flow chart showing a method of operation of a voice controlled audio recording system with adjustable beamforming in accordance with various embodiments.
Figure 9:
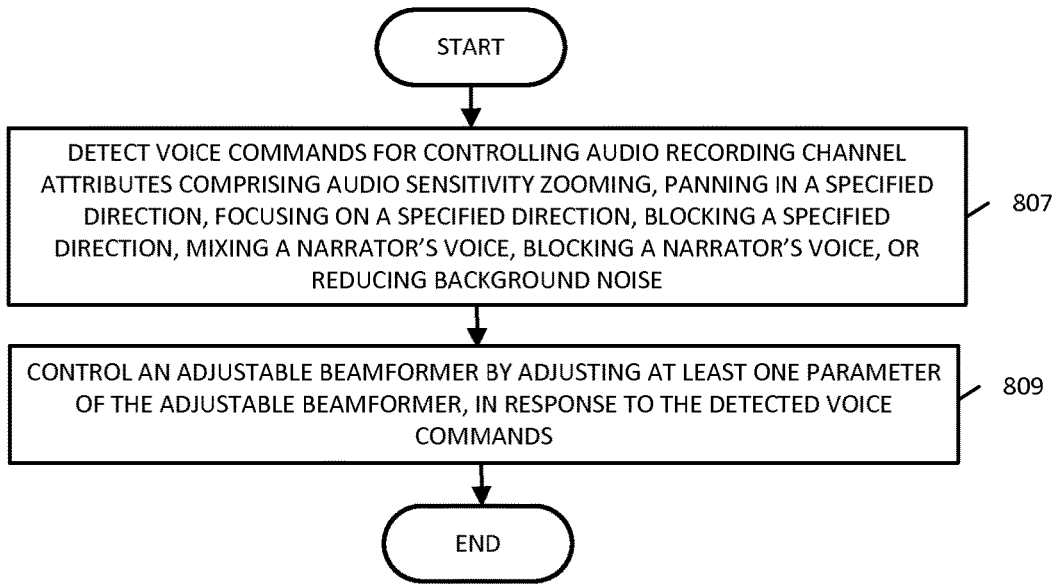
FIG. 9 is a flow chart showing a method of operation of a voice controlled audio recording or transmission apparatus with adjustable beamforming in accordance with various embodiments.

Example methods of operation of the apparatus 100 and the apparatus 200 are illustrated by the flowcharts of FIG. 8 and FIG. 9. Beginning with the method of operation of FIG. 8, in operation block 801, the beamformer 120 performs beam forming on a plurality of microphone outputs, such as the microphone outputs 112, to obtain a plurality of virtual microphone audio channels with at least one audio recording channel and at least one audio control channel. A shown in the examples of FIG. 1A, FIG. 1B and FIG. 2, the beamformer 120 provides audio output channel 107, audio output channel 109, and control channel 117 by performing beamforming on the microphone outputs 112.

In operation block 803, the voice command recognition logic 103 performs voice recognition on at least one audio control channel, such as audio control channel 117, to detect voice commands for controlling audio recording channel attributes of at least one audio recording channel. In other words, the voice command recognition logic 103 will detect any voice commands (i.e. voice command words or phrases) detected on the audio control channel 117 in FIG. 1A, FIG. 1B, or on the conditioned control channel 161 in the FIG. 2 embodiment. If a command word or command phrase is detected, then the voice command recognition logic 103 will send control signal 127 to the beamformer controller 140. In embodiments such as shown in FIG. 2, which include the signal conditioner controller 150, the voice command recognition logic 103 will also send the control signal 155 to the signal conditioner controller 150.

The beamformer controller 140 and the signal conditioner controller 150 will respond to detected command words or command phrases that are related to control of audio attributes for their respective control functions. The system control 105 receives control signal 139 from the voice command recognition logic 103 and will respond to those voice commands that are not related to audio recording but that are related to performing its own system control functions such as, for example, video system control. This may be implemented in the various embodiments in various ways, such as but not limited to, using digital codes or addressing mapped to specific command words or command phrases. That is, a set of binary digits may be sent by the voice command recognition logic 103 in response to particular command words or command phrases, where the binary digits are a code representing the specific command word or command phrase. Therefore, the system control 105, signal conditioner controller 150 and beamformer controller 140 may, in some embodiments, all concurrently receive the binary digits. However, only the intended recipient will decode the binary digits to interpret the command and take subsequent action, while the other recipients will ignore the command. Additionally, the beamformer controller 140 and signal conditioner controller 150 may be configured to receive and respond to specific digital codes or addresses send as the corresponding beamformer control signal 129 and signal conditioner control signal 151.

As shown in operation block 805, an attribute of at least one audio recording channel, such as audio output channel 107 or audio output channel 109, will be adjusted in response to detecting the voice command for controlling audio record channel attributes. That is, the signal conditioner controller 150 will send an appropriate signal conditioner control signal 151 to adjust an attribute of the signal conditioner 153 or the beamformer controller 140 will send an appropriate beamformer control signal 129 to adjust parameters of the beamformer 120. In one example, the beamformer controller 140 may change one or more filter coefficients of one of the filters 121, 123 or 125.

Turning to the flowchart of FIG. 9, in operation block 807, the voice commands detected by the voice command recognition logic 103 may include voice commands for controlling audio recording channel attributes such as, but not limited to, audio sensitivity zooming, panning in a specified direction, focusing on a specified direction, blocking a specified direction, mixing the narrator's voice, blocking a narrator's voice, or reducing background noise. In operation block 809, the beamformer controller 140 sends a beamformer control signal 129 to the beamformer 120 to adjust at least one parameter of the beamformer 120 in response to the detected voice commands. The method of operation then ends as shown in FIG. 9.

In accordance with the embodiments, filter logic 131A and filter logic 131B may be implemented in different ways. One example filter logic embodiment is provided in FIG. 3 and another example filter logic embodiment is provided in FIG. 4. The example filter logic shown in FIG. 3 and FIG. 4 may be used in the command word filtering logic 130 shown in either of the embodiments of FIG. 1B or FIG. 2. Beginning with the embodiment illustrated in FIG. 3, filter logic 231 includes an adaptive filter 233 which may be an adaptive finite impulse response (FIR), adaptive infinite impulse response (IIR) filter, frequency domain or some other appropriate type of adaptive filter. The adaptive filter 233 is operatively coupled to a control channel, such as control channel 117 in FIG. 1B, or the conditioned control channel 161 when used in the embodiment of FIG. 2. The control channel is operatively coupled to a delay 118 which provides a delayed control channel 119 as the input to the adaptive filter 233. The length of the delay is not less than the longest command word or command phrase that can be recognized by the voice command recognition logic 103. Put another way, the length of the delay is at least as long as the longest command word or command phrase used by the voice command recognition logic 103. The delay is added in order to make sure that the correct portion of the signal (that contains the command word or command phrase) is being processed.

The adaptive filter 233 is further operatively coupled to summation logic 235 and provides an adaptive filter output 243 as a subtraction input to the summation logic 235. The summation logic 235 is also operatively coupled to the record channel through a delay 108 to receive a delayed record channel 339 as an addition input. That is, the summation logic 235 subtracts the adaptive filter output 243 from the delayed record channel 339 to obtain summation logic output 239. The summation logic output 239 is operatively coupled to an adjustment input of the adaptive filter 233 in a feedback configuration. A switch 241 is operatively coupled to the summation logic 235 such that the summation logic output is operatively coupled to one terminal of the switch. A second terminal of switch 241 is operatively coupled to the delayed record channel 339, and the common terminal of switch 241 is operatively coupled to the recorder or voice transmission circuitry 101 to provide input 133. That is, the switch 241 is configured as a single-pole, double throw (SPDT) changeover switch in that switch 241 is operative to switch the recorder input 133 between the delayed record channel 339 and the summation logic output 239.

The switch 241 is also operatively coupled to the voice command recognition logic 103 to receive a control signal 137. The control signal 137 controls switch 241 to switch the recorder input 133 to the summation logic output 239 in response to detection of an audio attribute command word or command phrase detected by the voice command recognition logic 103. In other words, the control signal 137 provides an indication that an audio attribute command word or command phrase was detected by the voice command recognition logic 103.

Another switch 245 is operatively coupled to an adaptive filter enable input 247 and is configured as a single pole, single throw (SPST) on-off switch. The switch 245 is also operatively coupled to the voice command recognition logic 103 to receive the control signal 137. The control signal 137 will operate the switch 245 such that when the switch 245 is in the closed position (i.e. "on") the adaptive filter enable input 247 is activated and the adaptive filter 233 begins operation. As shown by the dotted line 249, switch 241 and switch 245 operate concurrently such that when the switch 241 connects the recorder input 133 to the summation logic output 239, switch 245 is switched "on" to provide the adaptive filter enable signal 247 and activate the adaptive filter 233.

In some embodiments the switches 241 and 245 may be implemented as a single logic circuit with a single control signal 137 connection from the voice command recognition logic 103. In other embodiments, one or both of switch 241 and switch 245 may be implemented by tri-state logic (i.e. a tri-state buffer as an SPST switch, etc.) as understood by those of ordinary skill. Thus, in operation of the command word filtering logic 130, the filter logic 231 is deactivated until the voice command recognition logic 103 detects a command word or command phrase and sends the control signal 137 to switch 241 and switch 245 to connect the recorder input 133 to the summation logic output 239 and to enable the adaptive filter 233 by providing the adaptive filter enable signal 247, respectively. Therefore, the filter logic 231 attenuates or eliminates any command word or command phrase from the delayed record channel 339 and thus from the recorded audio, in response to detection of command words or command phrases that are detected by the voice command recognition logic 103 on the virtual audio control channel (such as control channel 117 or conditioned control channel 161).

The delay 108 and delay 118 may be implemented in any appropriate manner such as, but not limited to, using a circular buffer or some other delay implementation. The delay is implemented to accommodate the longest expected command word or command phrase for the voice command recognition control system. Put another way, the length of the delay may be at least as long as the longest command word or command phrase used by the voice command recognition logic 103.

Figure 4:
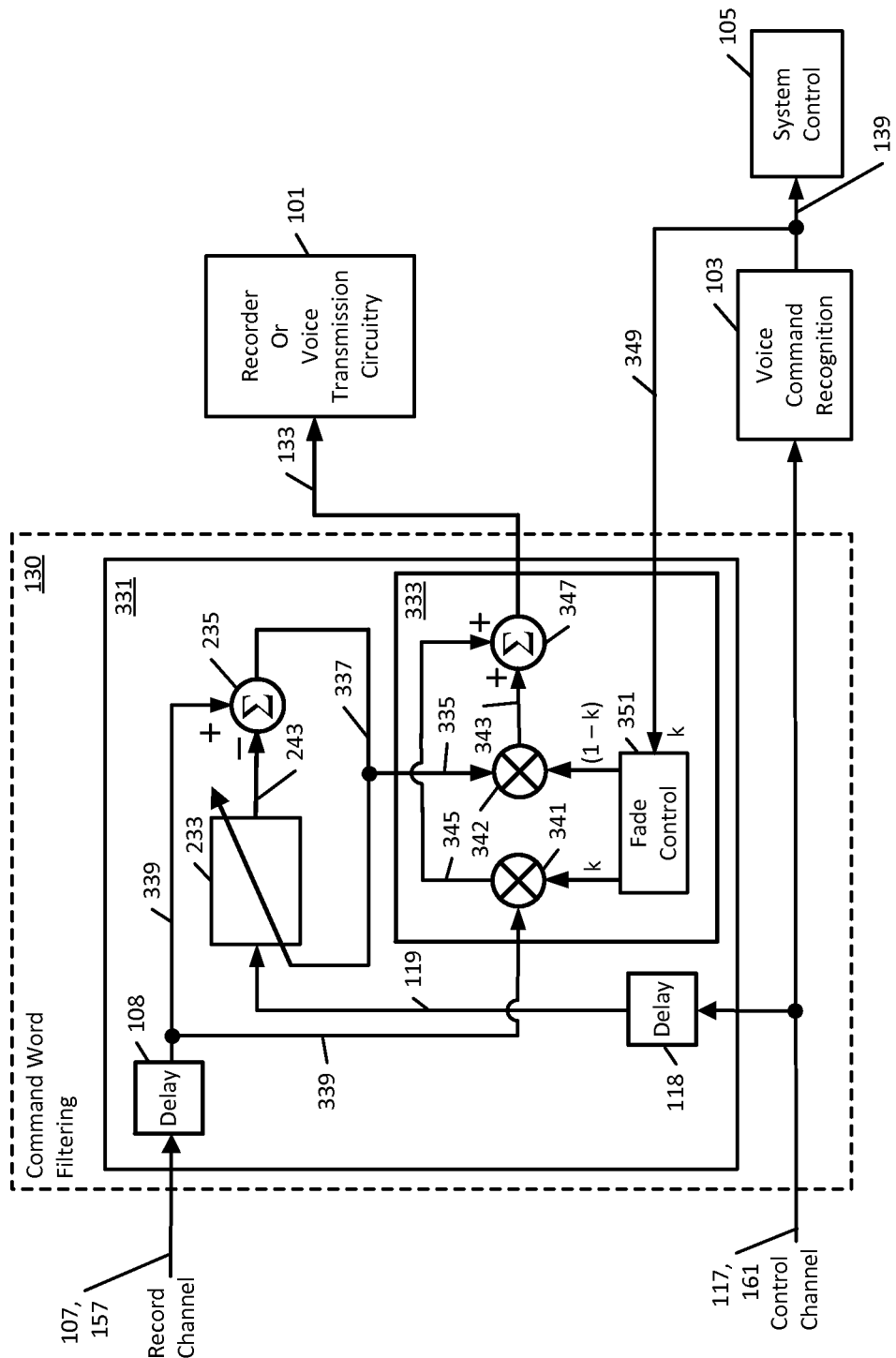
FIG. 4 is a schematic block diagram of one example filter logic implementation of command word filtering logic of a voice controlled audio recording or transmission apparatus with adjustable beamforming in accordance with another embodiment.

FIG. 4 illustrates another embodiment of a filter logic block of the command word filtering logic 130 which may be used in either of the embodiments shown in FIG. 1A, FIG. 1B or FIG. 2. Similar to the filter logic 231, the filter logic 331 also includes an adaptive filter 233 which is operatively coupled to summation logic 235 to provide an adaptive filter output 243 as a subtraction input to summation logic 235. The filter logic 331 adaptive filter 233 is also operatively coupled to a control channel (such as control channel 117 or conditioned control channel 161), and the control channel is operatively coupled to a delay 118 which provides a delayed control channel 119 as the input to the adaptive filter 233. The delay lengths are the same as for filter logic 231, that is, the length of the delay is at least as long as the longest command word or command phrase used by the voice command recognition logic 103.

The summation logic 235 is also operatively coupled to a record channel (such as audio output channel 107 or conditioned record channel 157) through a delay 108 to receive a delayed record channel 339 as an addition input. Thus, the summation logic 235 of filter logic 331 subtracts the adaptive filter output 243 from the delayed record channel 339 to obtain summation logic output 337. The summation logic output 337 is also operatively coupled to an adjustment input of the adaptive filter 233 in a feedback configuration for filter logic 331.

Filter logic 331 also includes mixer logic 333 which provides an automatic fade control that fades between a filtered and unfiltered version of an audio channel. In addition to providing feedback to the adaptive filter 233 adjustment input, the summation logic output 337 is also input to the mixer logic 333. Mixer logic 333 includes a first multiplier 341 that is operatively coupled to the delay 108 to receive the delayed record channel 339 which is, in other words, an unfiltered version of the record channel. A fade control 351 is operatively coupled to the voice command recognition logic 103 to receive the voice command recognition signal 349 which is used by the fade control 351 to weight filtered and un-filtered versions of the record channel. A second multiplier 342 is operatively coupled to the summation logic 235 and receives the summation logic output 337 as multiplier input 335. In other words the summation logic output 337 is a filtered version of the record channel. The first multiplier 341 and the second multiplier 342 are both operatively coupled to the fade control 351 to receive a weighting input "k" and "1-k" respectively, to weight the respective unfiltered and filtered versions of the record channel. Specifically, the first multiplier 341 provides a first multiplier output 345 to mixer summation logic 347 and the second multiplier 342 provides a second multiplier output 343 to the mixer summation logic 347. The mixer summation logic 347 adds the two multiplier outputs and provides the input 133 to the recorder or voice transmission circuitry 101. In other words, in filter logic 331, the adaptive filter 233 constantly operates on the delayed record channel 339 and provides an output to the mixing logic 333 to subtract or attenuate detected command words or command phrases from the recorder input 133. In operation, the mixer logic 333 functions as a "fader" that fades between the filtered (i.e summation logic output 337) and un-filtered (i.e. delayed record channel 339) recording channel signals. The adaptive filter 233 is trained to filter the delayed control channel 119 which is subtracted from the delayed record channel by the summation logic 235 to obtain the summation logic output 337. The mixer logic 333 operation is controlled by the voice command recognition logic signal 349 which is used to weight the filtered and un-filtered record channel multiplier inputs. That is, the delayed record channel 339 is multiplied by "k" by the first multiplier 341 and the summation logic output 337 is multiplied by "(1−k)" by the second multiplier 342 to control the fading operation.

Figure 3:
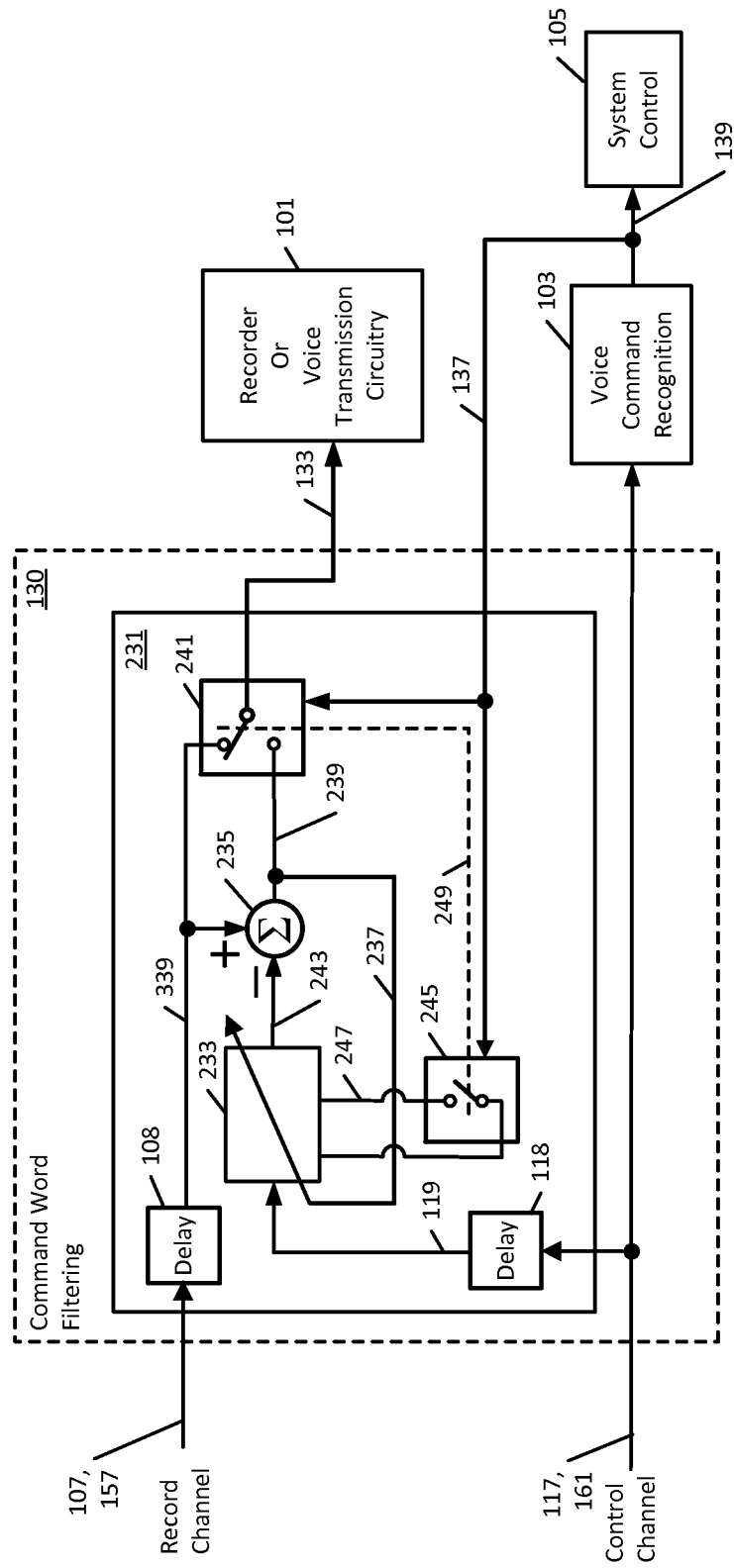
FIG. 3 is a schematic block diagram of one example filter logic implementation of command word filtering logic of the voice controlled audio recording or transmission apparatus with adjustable beamforming in accordance with an embodiment.
Figures 10, 11:
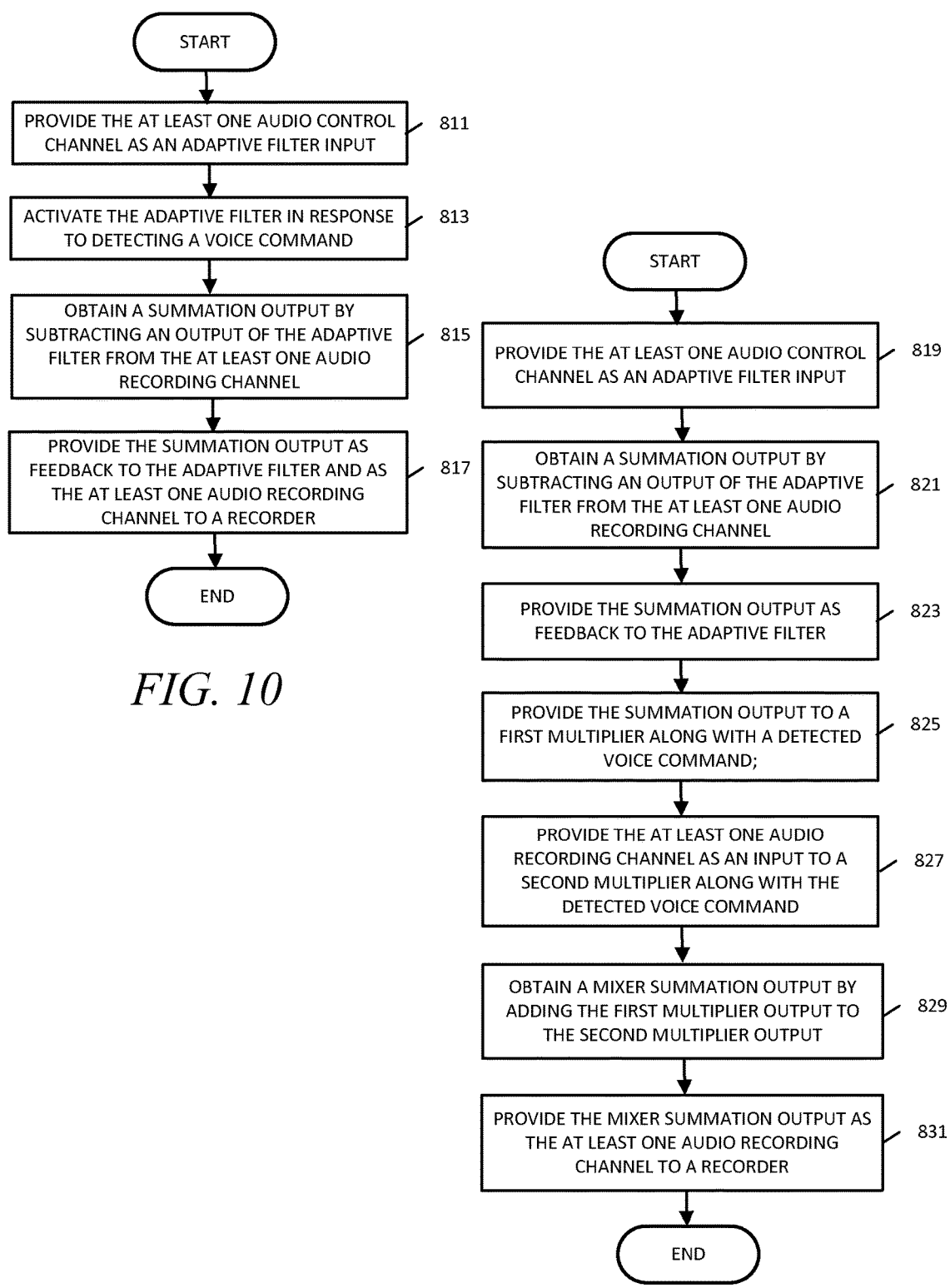
FIG. 10 is a flow chart showing a method of operation of filter logic of a command word filtering section of a voice controlled audio recording apparatus with adjustable beamforming in accordance with an embodiment.
FIG. 11 is a flow chart showing a method of operation of filter logic of a command word filtering section of a voice controlled audio recording apparatus with adjustable beamforming in accordance with an embodiment.

An example method of operation of the filter logic 231 is illustrated by the flowchart of FIG. 10. The method of operation begins and in operation block 811 the filter logic 231 is provided with the at least one audio control channel as an adaptive filter input. For example, the audio control channel 117 in the embodiment of FIG. 1 or the conditioned control channel 161 in the embodiment of FIG. 2 may be operatively coupled to the adaptive filter 233 input. In operation block 813 the adaptive filter is activated in response to detecting the voice command, such as a command word or command phrase, by the voice command recognition logic 103. As described above, the control signal 137 closes switch 245 to send an adaptive filter enable signal 247 and activate adaptive filter 233. In operation block 815, a submit summation logic output 239 is obtained by subtracting the adaptive filter output 243 from the audio recording channel. More specifically, as shown in FIG. 3, the summation logic 235 subtracts the adaptive filter output 243 from the delayed record channel 339 to produce the summation logic output 239. In operation block 817, the summation logic output 239 is provided as feedback 237 to the adaptive filter 233 adjustment input and is also provided as the recorder input 133 to recorder or voice transmission circuitry 101 (switch 241 is operated to connect to summation logic output 239). The method of operation than ends as shown.

A method of operation corresponding to the filter logic 331 of the embodiment of FIG. 4 is illustrated by the flowchart of FIG. 11. In operation block 819, at least one audio control channel is provided as an adaptive filter input. For example, as shown in FIG. 4, the delayed control channel 119 is provided to adaptive filter 233. In operation block 821, a summation block output is obtained by subtracting the adaptive filter output 243 from the delayed record channel 339. In operation block 823, the summation logic output 337 is provided as feedback to the adaptive filter 233 adjustment input. In operation block 825, the summation block output is provided to the first multiplier along with the detected voice command. For example, the summation logic output 337 is provided to the mixer logic 333 and is specifically provided as multiplier input 335 to second multiplier 342. In operation block 827, the at least one audio recording channel is provided as an input to a second mixture along with the detected voice command. As shown in FIG. 4, the delayed record channel 339 is input to the first multiplier 341 along with the voice command recognition signal 349. In operation block 829, a mixer summation output is obtained by adding the first multiplier output to the second multiplier output. As shown in FIG. 4, multiplier output 345 and multiplier output 343 are provided to the mixer summation logic 347. In operation block 831, and as shown in FIG. 4, the mixer summation logic 347 output is provided as recorder input 133 to the recorder or voice transmission circuitry 101. The method of operation then ends as shown in FIG. 11.

Figure 12:
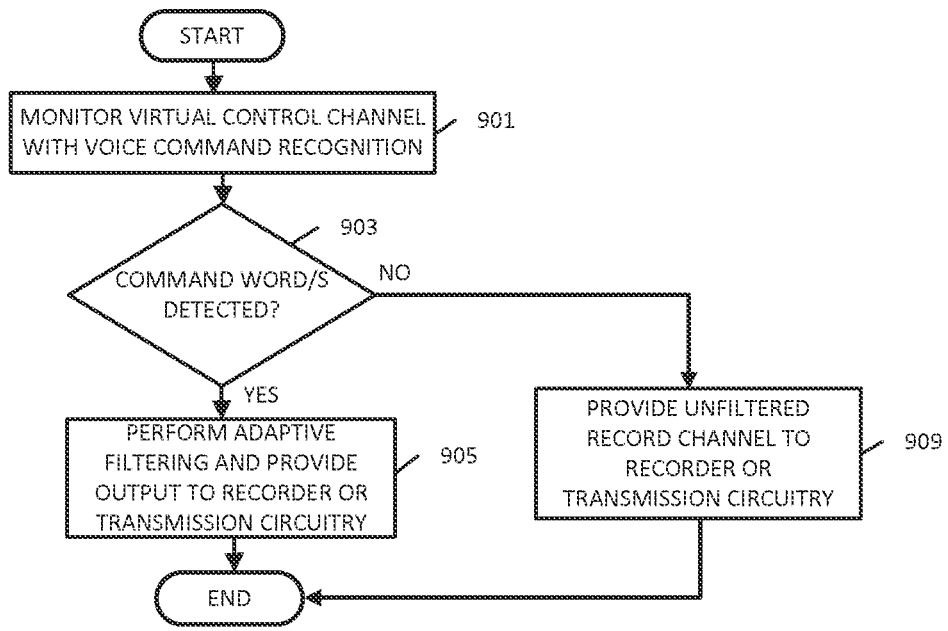
FIG. 12 is a flow chart showing another method of operation of filter logic of a command word filtering section of a voice controlled audio recording apparatus with adjustable beamforming in accordance with an embodiment.

The flowchart of FIG. 12 provides another method of operation related to the filter logic 231 illustrated in FIG. 3. The method of operation begins, and in operation block 901 the voice command recognition logic 103 monitors a virtual control channel for voice commands. If command word is detected by the voice command recognition logic 103 in decision block 903, then the adaptive filter 233 is activated in operation block 905. If no command words are detected in decision block 903, then in operation block 909 the unfiltered record channel is provided to the recorder and the method of operation ends. For example, switch 241 connects the recorder input 133 to the delayed record channel 339 as shown in FIG. 3. If command words are detected, then the adaptive filter 233 is activated as shown in operation block 905 and the output is provided to the recorder. That is, the adaptive filter output 243 is subtracted from the record channel and the subtraction result (i.e. summation logic output 239) is then provided as feedback 237 to the adaptive filter 233 and as an input to the recorder or voice transmission circuitry 101 and the method of operation ends. In other embodiments, the filter operation in block 905 could be accomplished by, for example, correlation, and may be done after recording (i.e. post recording).

Therefore, among other advantages of the various embodiments, regardless of the direction of the control channel beam, the voice controlled audio recording system in accordance with the embodiments will suppress noise from other directions and will have a signal-to-noise ratio suitable to drive the voice command recognition logic 103. The virtual microphone used for the control channel, among other things, reduces extraneous sound to enhance the control channel signal-to-noise ratio. Upon voice command identification for commands to control audio attributes, the beamformer 120 and other audio processing such as signal conditioner 153 (which may include noise suppression, gain, etc.) will be adjusted accordingly to provide the desired audio recording attributes. Another advantage of the various embodiments is that the control channel and voice command recognition logic 103 are used to eliminate the control channel sound (i.e. voice commands) from the recording channel. Another advantage of the various embodiments is that, upon recognizing a voice command by the voice command recognition logic 103, an adaptive filter, trained on the control channel, is used to subtract the remaining command word segment from the appropriately delayed recording channel.

One example embodiment of a beamformer controller 140 is illustrated by the partial schematic block diagram provided in FIG. 5. The example beamformer controller shown in FIG. 5 may be used in either of the embodiments described with respect to FIG. 1 or FIG. 2. The example beamformer controller 140 includes a memory table 541 and an operatively coupled selector 543. The memory table 541 may store preconfigured beam patterns for predetermined virtual microphone configurations. The preconfigured beam patterns may be stored by storing filter coefficients or other filter parameters that may be used by the beamformer 120 to create the desired audio beam patterns, such as the example beam pattern for the virtual microphone example provided in FIG. 7. The selector 543 maps voice command words to appropriate memory locations to obtain the desired result, based on a current configuration in operation, using the beamformer 120. For example, assuming a virtual microphone configuration similar to the example shown in FIG. 7, the operator may speak the command words "focus left." The selector 543 will receive the code as control signal 127, which may be a string of binary digits or may be an application programming interface (API) command, and will recognize the code or API command as related to the command "focus left." The selector 543 will send the selection input 545, which may be implemented as a pointer, to the correct location of the memory table 541 to identify the stored filter coefficients or other stored beamformer 120 parameters that will cause the beamformer 120 to focus the existing virtual microphone beams on subjects to the left of the recording apparatus. The memory table output 547 is then provided to the beamformer 120 as the beamformer control signal 129.

The memory table 541 may be stored in an internal memory of the beamformer controller 140, or in system memory 170. In either embodiment, the internal memory or system memory 170 is a non-volatile, non-transitory memory. In embodiments where the system memory 170 is used to store the memory table 541, the beamformer controller 140 is operatively coupled to the system memory 170 to send data to, and receive data from, the system memory 170. The selector 543 provides the selection input 545 to system memory 170 over a memory interface 171 and also receives the memory table output 547. The beamformer controller 140 forwards the memory table output 547 to the beamformer 120 as beamformer control signal 129.

The signal conditioning controller 150 may be implemented in a manner similar to the example beamformer controller 140 of FIG. 5. FIG. 6 provides one example embodiment of the signal conditioning controller 150. The example signal conditioning controller 150 includes a memory table 651 and an operatively coupled selector 653. The memory table 651 may store various audio parameters for predetermined audio attributes. The stored audio parameters may include noise suppression algorithms that may be selected for a noise suppression component of signal conditioner 153 or some other audio related algorithms to create the desired audio attributes.

The selector 653 maps voice command words to appropriate memory locations to obtain the desired result, based on a current configuration in operation by the signal conditioner 153. For example, the operator may speak the command words "suppress noise minus six dB" (i.e. suppress noise −6 dB) to invoke an appropriate noise suppression algorithm. The selector 653 will receive the code as control signal 127, which may be a string of binary digits or may be an application programming interface (API) command, and will recognize the code or API command as related to the command "suppress noise minus six dB." The selector 653 will send the selection input 655, which may be implemented as a pointer, to the correct location of the memory table 651 to identify the stored parameters that will cause the signal conditioner 153 to invoke the appropriate noise suppression algorithm. The memory table output 657 is then provided to the signal conditioner 153 as the signal conditioner control signal 151.

The memory table 651 may be stored in an internal memory of the signal conditioning controller 150, or in system memory 170 similar to memory table 541. In embodiments where the system memory 170 is used to store the memory table 651, the signal conditioning controller 150 is operatively coupled to the system memory 170 to send data to, and receive data from, the system memory 170. The selector 653 provides the selection input 655 to system memory 170 over a bi-directional memory interface 173 and also receives the memory table output 657. The signal conditioning controller 150 forwards the memory table output 657 to the signal conditioner 153 as the signal conditioner control signal 151.

It is to be understood that the various "control signals" described above with respect to various components such as, but not limited to, the voice command recognition logic 103, the beamformer controller 140, the signal conditioner controller 150, etc., may be implemented in various ways such as using APIs between the various components. Additionally, the memory table operations shown in FIG. 5 and FIG. 6 may be implemented using pointers and a single memory table stored in system memory 170 etc. Furthermore, control signal 129 and control signal 151 may be implemented such that the beamformer 120 and the signal conditioner 153 obtain control information such as, but not limited to, audio attribute parameters, filter coefficients etc., from system memory 170 and that such implementations are contemplated embodiments and in accordance with the embodiments and examples described herein.

Figure 13:
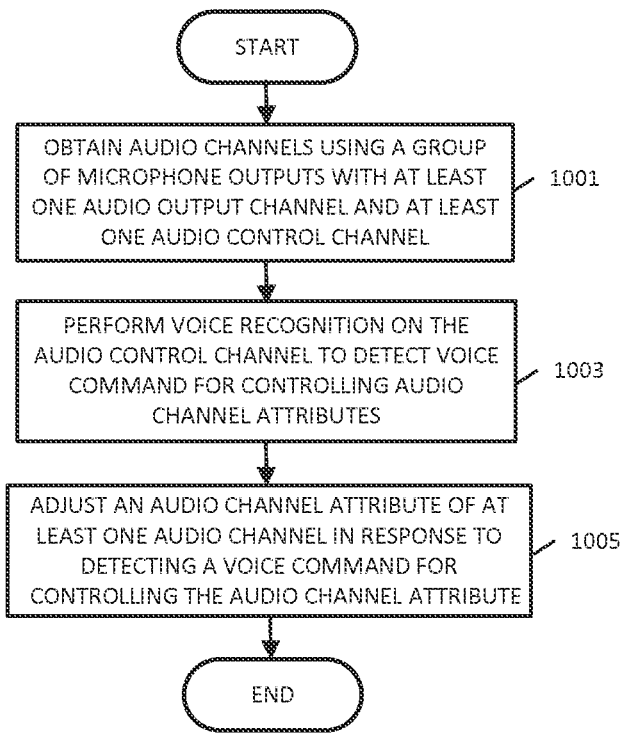
FIG. 13 is a flow chart showing another method of operation of an apparatus as shown in FIG. 1A, FIG. 1B or FIG. 2.

The flowchart of FIG. 13 provides another method of operation related to the embodiments described with respect to FIG. 1A, FIG. 1B or FIG. 2. In operation block 1001, the group of microphones 110 may be used to form at least one audio recording channel and at least one audio control channel. This may be accomplished by using single microphone outputs as an audio channel or by beamforming two or more of the microphone outputs to form audio channels such as a virtual audio recording channel and a virtual audio control channel or by combinations or both (virtual and non-virtual audio channels). For non-virtual audio channels, the beamformer 120 passes the appropriate microphone output through as a record channel or as a control channel without any beamforming applied. In operation block 1003, the voice command recognition logic 103 performs voice recognition on the audio control channel to detect voice commands for controlling audio control channel and audio recording channel attributes. In the various embodiments, the audio channel attributes may be related to directivity of the audio channel, or to non-directivity related attributes such as those attributes related to signal conditioning applied to the audio channel. In other words, in the case of directivity control, the voice commands may control beamform patterns applied to virtual audio channels, or may switch directional microphones to point to the front or rear of the apparatus, etc. Such directivity control may be applied to audio recording channels or to audio control channels. In the case of signal conditioning control, signal conditioning may be controlled for audio recording channels in various ways as was described in detail above with respect to the various embodiments. Thus, in operation block 1005, an audio channel attribute is adjusted for an appropriate audio channel in response to detection of a voice command (on the audio control channel) for controlling an audio channel attribute of the respective corresponding audio channel.

While various embodiments have been illustrated and described, it is to be understood that the invention is not so limited. Numerous modifications, changes, variations, substitutions and equivalents will occur to those skilled in the art without departing from the scope of the present invention as defined by the appended claims.

What is claimed is:

1. A computer-implemented method, comprising:
receiving, by a beamformer of a device, and from one or more physical microphones, a plurality of audio signals;
generating, by the beamformer, and based on the plurality of audio signals, first and second beamforms that respectively correspond to first and second virtual microphones, the first virtual microphone being configured to receive data corresponding to audio control commands, and the second virtual microphone being configured to receive data that is recorded or transmitted by the device;
determining, by a voice command recognition module that is operatively coupled to the beamformer of the device, that audio data received through the first virtual microphone corresponds to a command directly specifying an adjustment to an attribute of a second virtual microphone; and
responsive to determining that the audio data received through the first virtual microphone corresponds to the command directly specifying the adjustment to the attribute of the second virtual microphone, adjusting the attribute of the second virtual microphone corresponding to the second beamform generated by the beamformer, wherein the attribute of the second virtual microphone comprises at least one non-directional audio attribute of the second virtual microphone.

2. The method of claim 1, wherein the attribute of the second virtual microphone comprises a signal conditioning algorithm applied to the data that is to be recorded or transmitted by the device.

3. The method of claim 2, wherein the signal conditioning algorithm comprises a noise suppression algorithm, a signal gain algorithm, a signal equalization algorithm, or an automatic gain control algorithm.

4. The method of claim 1, further comprising:
responsive to determining, by the voice command recognition module of the device, that the audio data received through the first virtual microphone corresponds to the command for adjusting the attribute of the second virtual microphone:
activating at least one adaptive filter; and
performing adaptive filtering using the at least one adaptive filter to attenuate the command in the second virtual microphone.

5. A system comprising:
one or more physical microphones;
one or more computers; and
one or more storage devices storing instructions that, when executed by the one or more computers, cause the one or more computers to:
receive, by a beamformer, and from the one or more physical microphones, a plurality of audio signals;
generate, by the beamformer, and based on the plurality of audio signals, first and second beamforms that respectively correspond to first and second virtual microphones, the first virtual microphone being configured to receive data corresponding to audio control commands, and the second virtual microphone being configured to receive data that is recorded or transmitted by the one or more computers;
determine, by a voice command recognition module that is operatively coupled to the beamformer, that audio data received through the first virtual microphone corresponds to a command directly specifying an adjustment to an attribute of a second virtual microphone; and
responsive to determining that the audio data received through the first virtual microphone corresponds to the command directly specifying the adjustment to the attribute of the second virtual microphone, adjust the attribute of the second virtual microphone corresponding to the second beamform generated by the beamformer, wherein the attribute of the second virtual microphone comprises at least one non-directional audio attribute of the second virtual microphone.

6. The system of claim 5, wherein the attribute of the second virtual microphone comprises a signal conditioning algorithm applied to the data that is to be recorded or transmitted.

7. The system of claim 6, wherein the signal conditioning algorithm comprises a noise suppression algorithm, a signal gain algorithm, a signal equalization algorithm, or an automatic gain control algorithm.

8. The system of claim 5, comprising:
responsive to determining, by the voice command recognition module, that the audio data received through the first virtual microphone corresponds to the command for adjusting the attribute of the second virtual microphone, the instructions further cause the one or more computers to:
activate at least one adaptive filter; and
perform adaptive filtering using the at least one adaptive filter to attenuate the command in the second virtual microphone.

9. A non-transitory computer-readable medium storing instructions executable by one or more computers that, upon execution, cause the one or more computers to perform operations comprising:
receiving, by a beamformer, and from one or more physical microphones, a plurality of audio signals;
generating, by the beamformer, and based on the plurality of audio signals, first and second beamforms that respectively correspond to first and second virtual microphones, the first virtual microphone being configured to receive data corresponding to audio control commands, and the second virtual microphone being configured to receive data that is recorded or transmitted by the one or more computers;
determining, by a voice command recognition module that is operatively coupled to the beamformer, that audio data received through the first virtual microphone corresponds to a command directly specifying an adjustment to an attribute of a second virtual microphone; and
responsive to determining that the audio data received through the first virtual microphone corresponds to the command directly specifying the adjustment to the attribute of the second virtual microphone, adjusting the attribute of the second virtual microphone corresponding to the second beamform generated by the beamformer, wherein the attribute of the second virtual microphone comprises at least one non-directional audio attribute of the second virtual microphone.

10. The non-transitory computer-readable storage medium of claim 9, wherein the attribute of the second virtual microphone comprises a signal conditioning algorithm applied to the data that is to be recorded or transmitted by the one or more computers.

11. The non-transitory computer-readable storage medium of claim 10, wherein the signal conditioning algorithm comprises a noise suppression algorithm, a signal gain algorithm, a signal equalization algorithm, or an automatic gain control algorithm.

12. The non-transitory computer-readable storage medium of claim 9, wherein the operations further comprise:
responsive to determining, by the voice command recognition module, that the audio data received through the first virtual microphone corresponds to the command for adjusting the attribute of the second virtual microphone:
activating at least one adaptive filter; and
performing adaptive filtering using the at least one adaptive filter to attenuate the command in the second virtual microphone.

* * * * *